United States Patent
Shin

(10) Patent No.: US 6,880,953 B2
(45) Date of Patent: Apr. 19, 2005

(54) MOLD FRAME, BACKLIGHT ASSEMBLY AND LIQUID CRYSTAL DISPLAY APPARATUS HAVING THE SAME

(75) Inventor: Jin Soo Shin, Suwon-si (KR)

(73) Assignee: Samsung Electronics Co., LTD, Gyeonggi-do (KR)

( * ) Notice: Subject to any disclaimer, the term of this patent is extended or adjusted under 35 U.S.C. 154(b) by 0 days.

(21) Appl. No.: 10/447,418

(22) Filed: May 28, 2003

(65) Prior Publication Data

US 2004/0001340 A1 Jan. 1, 2004

(30) Foreign Application Priority Data

Jun. 28, 2002 (KR) ........................................ 2002-37086

(51) Int. Cl.[7] .................................................. F21S 4/00
(52) U.S. Cl. ........................... 362/225; 362/26; 362/27; 362/31; 362/559
(58) Field of Search ............................ 362/225, 26, 27, 362/31, 559, 561; 349/58, 60, 62, 70, 61

(56) References Cited

U.S. PATENT DOCUMENTS

2003/0086255 A1 * 5/2003 Moon et al. .................. 362/97

* cited by examiner

Primary Examiner—Sandra O'Shea
Assistant Examiner—Mark Tsidulko
(74) Attorney, Agent, or Firm—DLA Piper Rudnick Gray Cary US LLP

(57) ABSTRACT

A mold frame receiving wires for supplying electric power to lamps in the mold frame, a backlight assembly having the mold frame and a liquid crystal display apparatus having the mold frame are presented. A mold frame installed in a direct illumination type backlight assembly has a first sidewall having first receiving spaces for respectively receiving first lamp sockets and at least one first return wire received in the first receiving spaces to be electrically connected to the first lamp sockets. The first return wire extends along the sidewalls of the mold frame. Accordingly, the mold frame may be reduced since the return wires are received and the lamp sockets are installed in the mold frame.

30 Claims, 13 Drawing Sheets

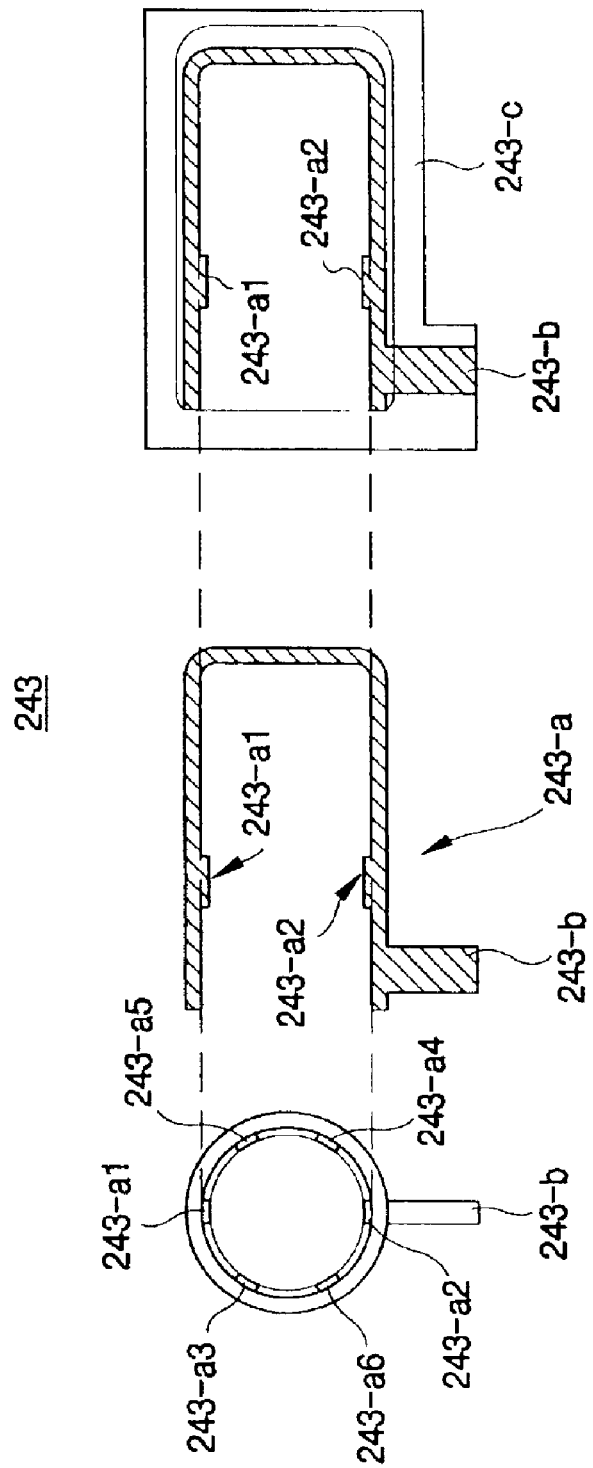

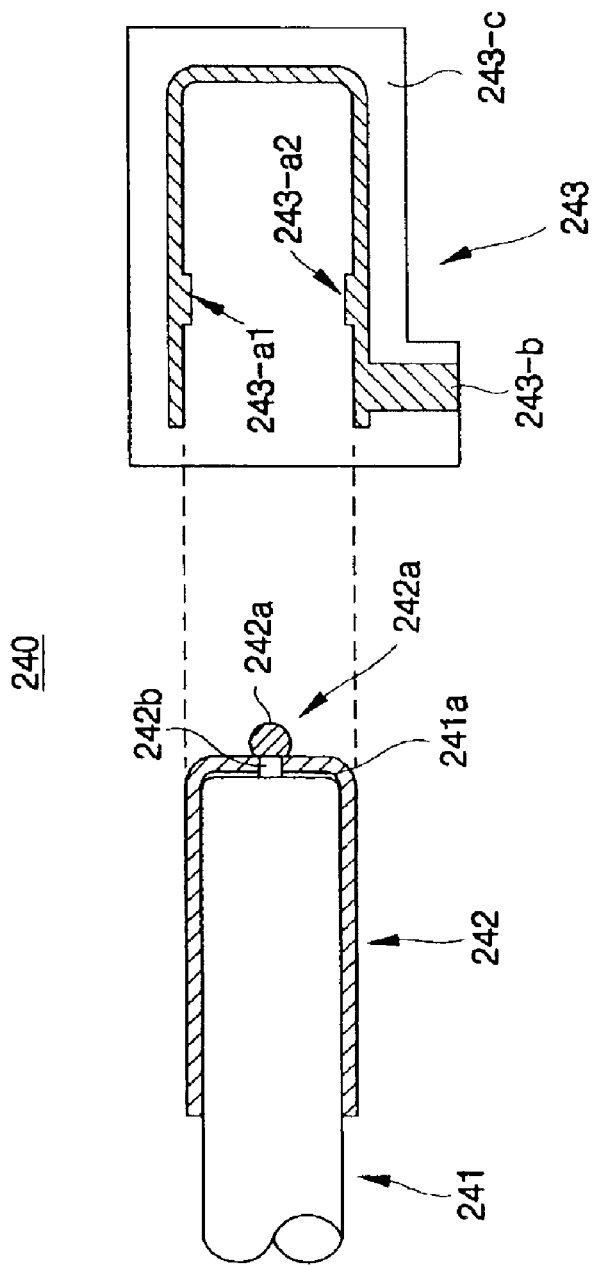

MOLD FRAME, BACKLIGHT ASSEMBLY AND LIQUID CRYSTAL DISPLAY APPARATUS HAVING THE SAME

RELATED APPLICATIONS

This application claims priority under 35 USC §119 to Korean Patent Application Serial No. 2002-37086 filed on Jun. 28, 2002, which is incorporated by reference herein.

BACKGROUND OF THE INVENTION

1. Field of the Invention

The present invention relates to a mold frame, a backlight assembly and a liquid crystal display (LCD) apparatus having the mold frame, and more particularly to a mold frame having a wire for supplying electric power to a lamp, a backlight assembly and an LCD apparatus having the mold frame.

2. Description of the Related Art

Most LCD apparatuses are non-emissive displays that display images by controlling light from an external light source. Thus, most LCD devices need to have a light source, such as a backlight assembly, for supplying light to an LCD panel. The backlight assembly is divided into an edge type backlight assembly and a direct illumination type backlight assembly.

In the edge type backlight assembly, a lamp unit is typically installed on a side of a light guide plate (LGP). The lamp unit includes a lamp emitting light, a lamp holder holding opposite end portions of the lamp and a reflection plate covering the lamp and reflecting the light emitted from the lamp to the LGP.

The edge type backlight assembly is typically used with a small LCD apparatus such as a monitor for a laptop computer and a monitor for a desktop computer. The edge type backlight assembly has various advantages such as high uniformity of light, a long life and so on.

The development of the direct illumination type backlight assembly has been strongly influenced by the advent and development of large-screen LCD apparatuses. In the direct illumination type backlight assembly, a plurality of lamps are disposed under a diffusion plate and directly emit light toward the surface of the LCD panel.

The direct illumination type backlight assembly uses the available light more efficiently than the edge type backlight assembly. Therefore, the direct illumination type backlight assembly is generally used in a large-screen LCD apparatus that demands high brightness.

FIG. 1 is an exploded perspective view of a conventional direct illumination type LCD apparatus.

Referring to FIG. 1, the direct illumination type LCD apparatus 100 includes an LCD panel assembly 110 and a backlight assembly 120 providing light to the LCD panel assembly 110.

The LCD panel assembly 110 includes an LCD panel 111 having a thin film transistor (TFT) substrate 111a, a color filter substrate 111b and liquid crystal (not shown). Also, the LCD panel assembly 110 includes a data printed circuit board (PCB) 115, a gate PCB, a data tape carrier package (TCP) 113 and a gate TCP 112.

The backlight assembly 120 includes a lamp unit 121 emitting a first light, a reflection plate 123 reflecting the first light, light controller 122 diffusing the first light to emit a second light having a uniform brightness, and a bottom chassis 125 that receives the lamp unit 121, the reflection plate 123, and the light controller 122. The light controller 122 includes a diffusion plate 122a, a diffusion sheet 122b disposed on the diffusion plate 122a, a lower prism sheet 122c on the diffusion sheet 122b, an upper prism sheet 122d on the lower prism sheet 122c and a protection sheet 122e on the upper prism sheet 122d.

The bottom chassis 125 has the shape of rectangular box with an open surface, or a rectangular box that is open on one side to provide a receiving space of a predetermined depth. The reflection plate 123 is placed in the receiving space and the lamp unit 121 is disposed parallel to each other on the reflection plate 123. The light controller 122 is disposed on the lamp unit 121 such that each member 122a through 122e of the light controller 122 is separated from the lamp unit 121 by a predetermined distance.

The lamp unit 121 has at least one lamp 121a, lamp holders 121b respectively located at first and second ends of each lamp 121a, a first electrode wire 121c coupled to the first end, and a second electrode wire 121d coupled to the second end. Power of a first level ("a first power) is supplied to the first electrode wire 121c of each lamp 121, and power of a second level ("a second power") is supplied to the second electrode wire 121d of each lamp 121. The first and second electrode wires 121c and 121d are connected to an electric power supply (not shown) generating the first and second electric powers.

When each of the first and second electrode wires 121c and 121d are connected to the electric power supply, one of the first and second electrode wire 121c and 121d should be extended so that it is close to the other electrode wire. In the example of FIG. 1, the second electrode wire 121d receiving an electric power lower than that of the first electrode wire 121c is extended to the first electrode wire 121c.

The second electrode wire 121d is disposed under the reflection plate 123 in order to prevent it from interfering with the image display achieved by the direct illumination type LCD apparatus 100. A receiving space is disposed between the reflection plate 123 and the bottom chassis 125 to receive the second electrode wire 121d.

A middle chassis 130 is disposed on the light controller 122, and the LCD panel 111 is disposed on the middle chassis 130. Then, a top chassis 140 is disposed on the LCD panel 111 and combined with the bottom chassis 125, sandwiching all the components between them. Accordingly, the direct illumination type LCD apparatus 100 is completely assembled.

As illustrated in FIG. 1, the backlight assemblies and the LCD apparatuses include exposed electrode wires located at opposite ends of the lamp(s). Since the shape and size of the backlight assemblies must accommodate these electrode wires, these electrode wires act as a hurdle to a more compact backlight assembly design. Thus, a backlight assembly that does not include exposed electrodes at both ends of the lamp(s) is desired.

BRIEF SUMMARY OF THE INVENTION

The present invention provides a mold frame having smaller dimensions than the conventional mold frame.

The present invention also provides a backlight assembly having the mold frame.

The present invention also provides a liquid crystal display apparatus having the backlight assembly.

In one aspect of the invention, there is provided a mold frame that supports two ends of a lamp in a direct illumination type backlight assembly. The mold frame includes multiple sidewalls, each of which has a first end portion and a second end portion. These multiple sidewalls can be arranged and connected to form a frame. More specifically, the mold frame includes 1) a first sidewall having first receiving spaces to respectively receive first lamp sockets covering first portions of the lamps, the lamp sockets supplying first electric powers to the lamps, and at least one first wire exposed in the first receiving spaces to be electrically connected to the first lamp sockets; 2) a second sidewall opposed to the first sidewall, the second sidewall having a second wire connected to the first wire; 3) a third sidewall having a first end portion connected to a first end portion of the first sidewall and a second end portion connected to a first end portion of the second sidewall, wherein at least one third wire is installed to connect the first wire to the second wire; and 4) a fourth sidewall having a first end portion connected to a second end portion of the first sidewall and a second end portion connected to a second end portion of the second sidewall.

In another aspect, there is provided a backlight assembly, which includes a first receiving container having a bottom face and sidewalls protruding from an edge portion of the bottom face; a lamp assembly having lamps for generating lights, and lamp sockets for respectively receiving at least portions of the lamps to supply electric power to the lamps, respectively; a second receiving container having sidewalls that fit with the sidewalls of the first receiving container, and at least one conductive line electrically connected to the lamp sockets; a light controlling means disposed on the sidewalls of the second receiving container for controlling paths of the lights emitted from the lamp assembly; and a third receiving container coupled with the second receiving container for fixing the position of the light controlling means.

Further, there is provided a liquid crystal display device (LCD), which comprises a backlight assembly for emitting light, the backlight assembly including a lamp assembly having lamp sockets for supplying electric powers to lamps, a light controlling means for controlling a path of light emitted from the lamp assembly, and a receiving container having at least one conductive line electrically connected to the lamp sockets; and a liquid crystal display panel disposed on the backlight assembly for displaying an image in response to the light emitted from the backlight assembly.

In this mold frame, this backlight assembly that includes the mold frame and this LCD apparatus that includes the mold frame, a return wire is received in the mold frame and lamp sockets are installed in the mold frame to reduce the size of the mold frame.

BRIEF DESCRIPTION OF THE DRAWINGS

The above and other advantages of the present invention will become readily apparent by reference to the following detailed description when considered in conjunction with the accompanying drawings wherein:

FIGS. 3A to 3C are schematic views illustrating the lamp cap and the lamp socket receiving the lamp cap shown in FIG. 2;

DETAILED DESCRIPTION OF THE INVENTION

Figure 1:
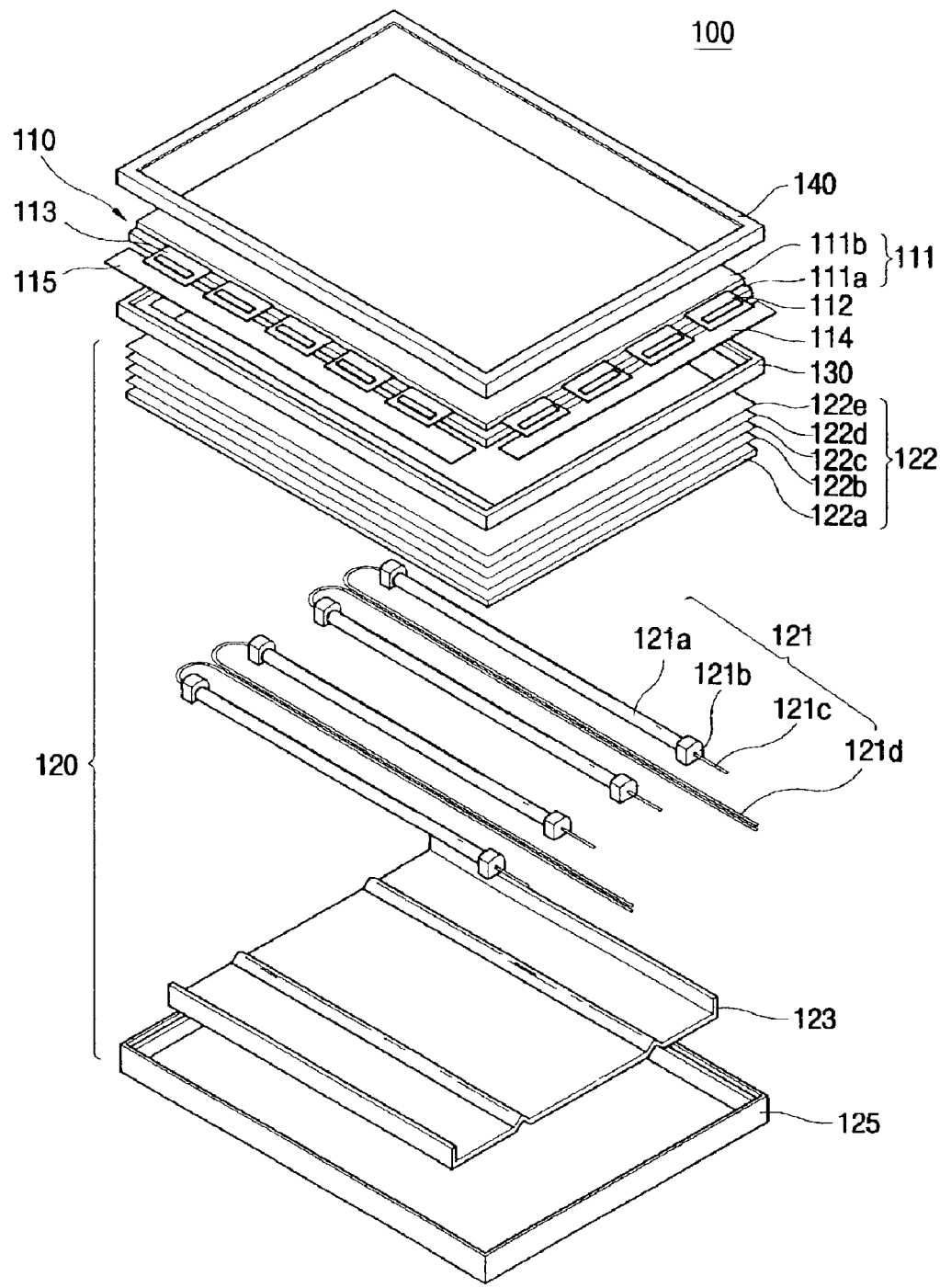
FIG. 1 is an exploded perspective view of a conventional direct illumination type LCD apparatus.
Figure 2:
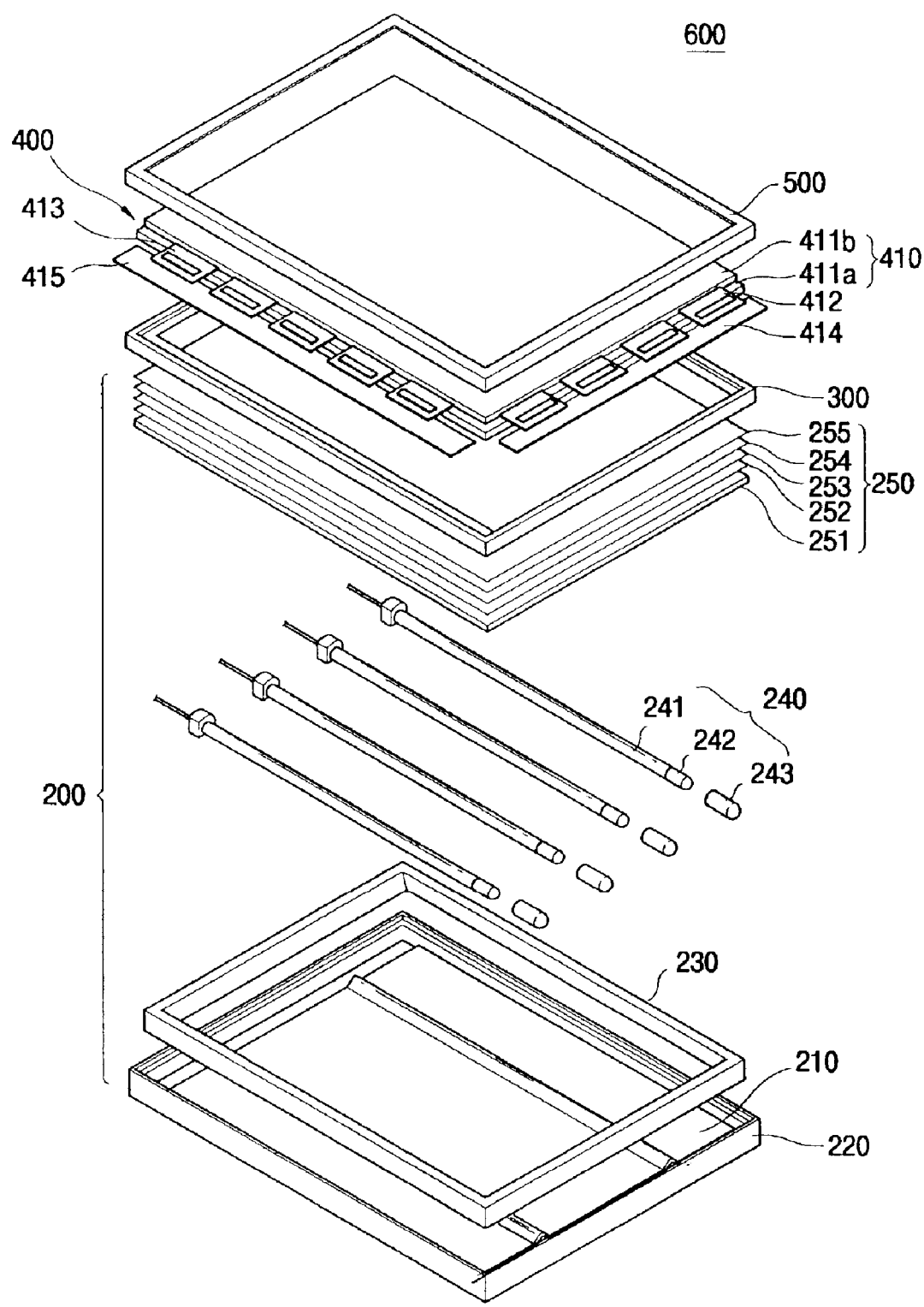
FIG. 2 is an exploded perspective view showing a structure of an LCD apparatus according to the present invention.

FIG. 2 is an exploded perspective view showing a structure of an LCD apparatus according to the present invention.

Referring to FIG. 2, an LCD apparatus 600 includes a direct illumination type backlight assembly 200 for providing light, a middle chassis 300, an LCD panel assembly 400 and a top chassis 500. The top chassis 500 combines with the middle chassis 300 and the backlight assembly 200 to fix the position of the LCD panel assembly 400 relative to the middle chassis 300.

The backlight assembly 200 has a reflection plate 210, a mold frame 230, a lamp unit 240 for emitting a first light, a light controlling member 250 for diffusing the first light to emit a second light having a substantially uniform brightness distribution and a bottom chassis 220 for receiving the lamp unit 240, the reflection plate 210 and the light controlling member 250. The mold frame 230 receives a wire for supplying an electric power to a lamp of the lamp unit 240. The light controlling member 250 includes a diffusion plate 251, a diffusion sheet 252, a lower prism sheet 253, an upper prism sheet 254 and a protection sheet 255 sequentially disposed on the diffusion plate 251.

The bottom chassis 220 includes a rectangular box having an open top surface. The bottom chassis 220 has a receiving space for receiving the reflection plate 210 and the lamp unit 240 disposed on the reflection plate 210. The bottom chassis 220 is combined with the mold frame 230 to fix the reflection plate 210 and the lamp unit 240 in position and helps dissipate the heat generated from the lamp unit 240 to the surrounding. The light controlling member 250 is disposed on the lamp unit 240.

The LCD apparatus 600 includes a plurality of lamps such as the lamps in the lamp unit 240. Each of the lamps includes a lamp 241, a lamp holder installed at a first end of the lamp 241, an electrode wire coupled to the first end of the lamp 241 through the lamp holder, a lamp cap 242 installed at a second end of the lamp 241, and a lamp socket 243 for receiving the lamp cap 242 to supply the electric power to the lamp cap 242.

The middle chassis 300 is disposed on the light controlling member 250, and the LCD panel assembly 400 is disposed on the middle chassis 300. The LCD panel assembly 400 includes an LCD panel 411 having a TFT (Thin Film Transistor) substrate 411a, a color filter substrate 411b and liquid crystal (not shown) interposed between the TFT substrate 411a and the color filter substrate 411b. The LCD panel assembly 400 also includes a data PCB (printed circuit board) 415, a gate PCB 414, a data TCP (tape carrier package) 413 and a gate TCP 412.

The top chassis 500 is disposed on the LCD panel 411. The direct illumination type LCD apparatus 600 is completely assembled when this top chassis 500 is combined with the bottom chassis 220, sandwiching all the components between them.

Figure 3A:
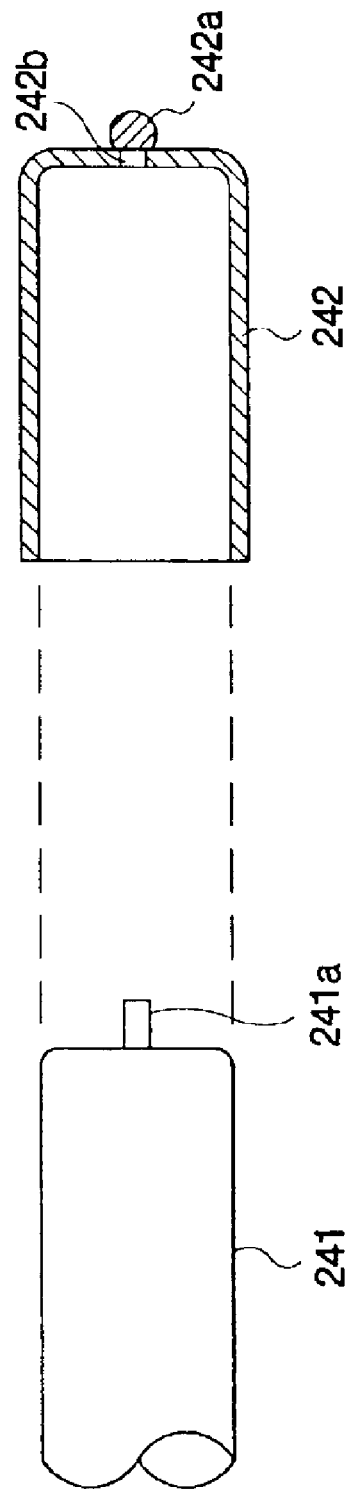

FIGS. 3A to 3C are schematic views illustrating the lamp cap and the lamp socket receiving the lamp cap 242 shown in FIG. 2. FIG. 3A is a schematic view showing a structure of the lamp cap that receives the lamp, FIG. 3B is a schematic view showing a structure of the lamp socket for receiving the lamp cap and FIG. 3C is a schematic view showing an assembled structure including the lamp cap and lamp socket.

As shown in FIG. 3A, the lamp 241 has a lead wire 241a through which electric power is received. The lamp cap 242 has a shape corresponding to that of the lamp 241 and a perforation hole 242b for exposing the lead wire 241a of the lamp 241. The lamp cap 242 has a soldering member 242a disposed on an outer surface thereof to cover the perforation hole 242b, so that the lead wire 241a exposed through the perforation hole 242b is in contact with the soldering member 242a. The electric power is supplied to the lamp 241 through the soldering member 242a and the lead wire 241a.

Referring to FIGS. 3B and 3C, the lamp socket 243 has a first conductive cap 243-a and an insulation cover 243-c disposed in a receiving space formed in a receiving container for receiving the first conductive cap 243-a. The insulation cover 243-c acts as a heat sink and helps dissipate the heat generated by the lamp 241.

First to sixth protruded members 243-a1, 243-a2, 243-a3, 243-a4, 243-a5 and 243-a6 are formed inside the first conductive cap 243-a for fixing the lamp cap 242 in place. Also, a seventh protruded member 243-b is formed outside the first conductive cap 243-a for being connected to a wire (not shown) supplying the electric power.

Figure 4:
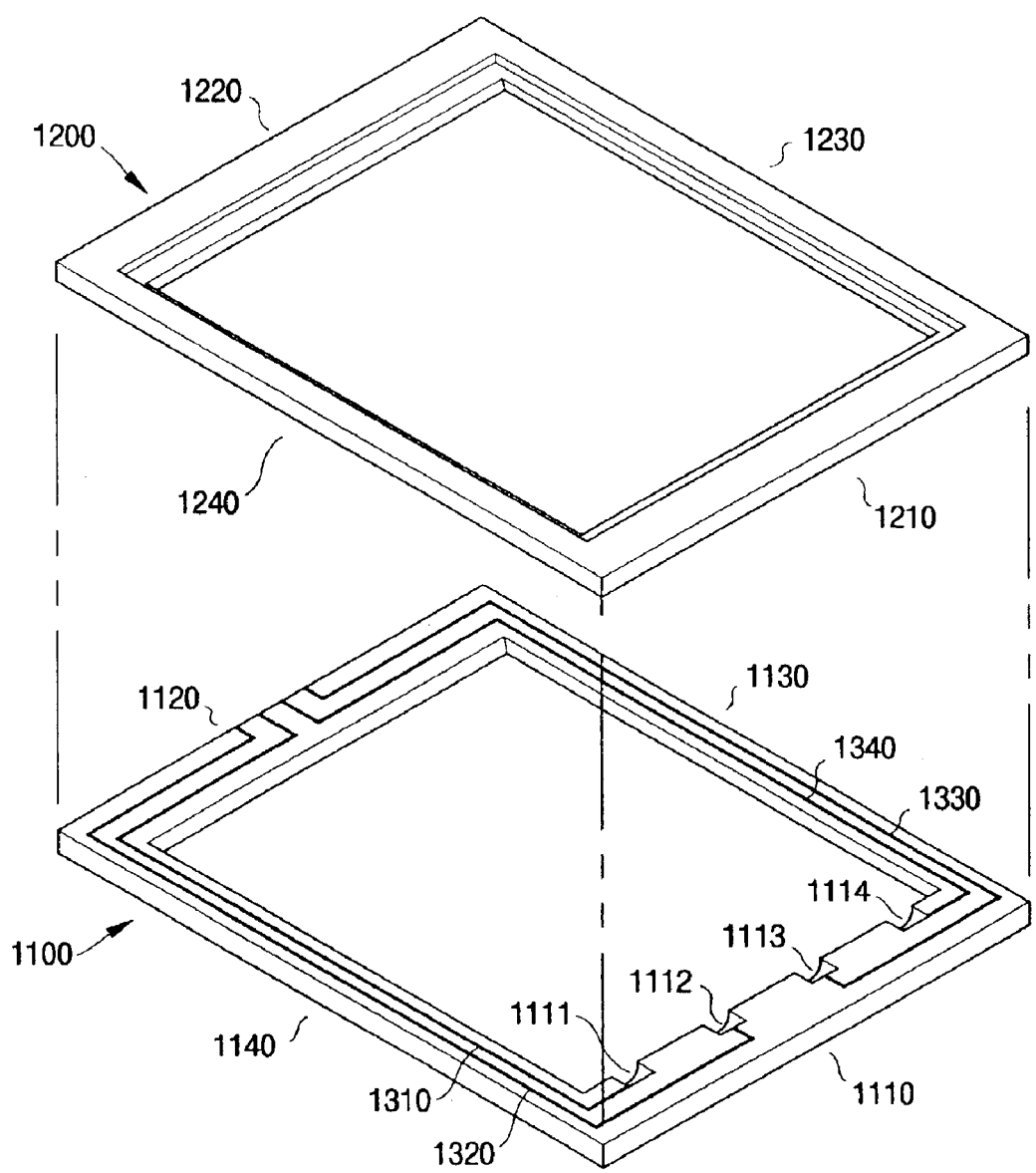
FIG. 4 is an exploded perspective view showing a structure of a mold frame according to an embodiment of the present invention.

FIG. 4 is an exploded perspective view showing a structure of a mold frame according to an embodiment of the present invention. In FIG. 4, an upper mold frame 1200 and a lower mold frame 1100 are shown in a decoupled state to clearly show a return wire received in the upper and lower mold frames.

Referring to FIG. 4, the mold frame includes a lower mold frame 1100, an upper mold frame 1200 and return wires 1310, 1320, 1330 and 1340 received between the lower and upper mold frames 1100 and 1200. Although not shown in FIG. 4, the return wires 1310, 1320, 1330 and 1340 may be received in the upper mold frame 1200.

The lower mold frame 1100 has first to fourth sidewalls 1110, 1120, 1130 and 1140, wherein the first sidewall 1110 has first receiving spaces 1111, 1112, 1113 and 1114. Also, the lower mold frame 1100 has two return wires 1330 and 1340 that extend from the first sidewall to the second sidewall 1120 via the third sidewall 1130. In addition, the lower mold frame 110 has another two return wires 1310 and 1320 that extend from the first sidewall to the second sidewall 1120 via the fourth sidewall 1140. The portions of the return wires 1310, 1320, 1330 and 1340 that are located on the first sidewall 1110 are positioned to come in contact with lamp sockets that are placed in the first receiving spaces 1111, 1112, 1113 and 1114, respectively.

In particular, the first sidewall 1110 has the first receiving spaces 1111, 1112, 1113 and 1114 and the return wires 1310, 1320, 1330 and 1340 received in the first sidewall 1110 to be electrically connected to the first receiving spaces 1111, 1112, 1113 and 1114, respectively. Thus, when one of the first lamp sockets 243 is disposed in one of the first receiving spaces 1111, 1112, 1113 and 1114, power is supplied to the end of the lamp that is covered by this lamp socket.

The second sidewall 1120 opposite to the first sidewall 1110 receives return wires 1310, 1320, 1330 and 1340 that extend from the first sidewall 1110.

The third sidewall 1130 is coupled to the first end portions of the first sidewall 1110 and second sidewall 1120. The return wires 1330 and 1340 are installed in the third sidewall 1130, wherein the return wires 1330 and 1340 are connected to the wires installed on the first sidewall 1110.

The fourth sidewall 1140 is disposed between second end portions of the first sidewall 1110 and the second sidewall 1120. The return wires 1310 and 1320 are installed in the fourth sidewall 1140, wherein the return wires 1310 and 1320 are connected to the wires installed on the first sidewall 1110.

In FIG. 4, the return wires 1330 and 1340 are described as extending from the first sidewall 1110 to the second sidewall 1120 via the third sidewall 1130, and the return wires 1310 and 1320 are described as extending from the first sidewall 1110 to the second sidewall 1120 via the fourth sidewall 1140. However, the invention is not limited to this arrangement and the return wires 1310, 1320, 1330 and 1340 may extend from the first sidewall 1110 to the second sidewall 1120 via either the third sidewall 1130 or the fourth sidewall 1140.

The upper mold frame 1200 has first to fourth sidewalls 1210, 1220, 1230 and 1240 arranged to substantially match the first to fourth sidewalls 1110, 1120, 1130 and 1140 of the lower mold frame 1100. Here, the first sidewall 1210 of the upper mold frame 1200 has second receiving spaces (not shown) that are arranged to substantially match the positions of the first receiving spaces 1111, 1112, 1113 and 1114 on the first sidewall 1110, respectively. In FIG. 4, the receiving spaces are described as round-shaped; however, the shapes of the receiving spaces may vary according to the shape of the lamp socket 243.

As aforementioned, the mold frame according to the embodiment of the present invention receives wires for supplying the electric power to the lamps therein, and these wires may be easily installed in the mold frame without an additional step for fixing the wires to the mold frame. Generally, assembling a backlight assembly with a mold frame includes disposing lamps in a mold frame, disposing a reflection plate on the lamps, arranging return wires on the reflection plate, disposing a bottom chassis on the reflection plate, then turning the layers upside down before overlaying optical sheets on the mold frame.

However, to assemble a backlight assembly with a mold frame according to the present invention, a reflection plate is disposed on a bottom surface of a bottom chassis, a mold frame is disposed on the reflection plate, lamps are placed in the mold frame, and then optical sheets are overlaid on them. With the invention, the additional steps such as turning the bottom chassis upside down and arranging the return wires are not necessary.

Figure 5:
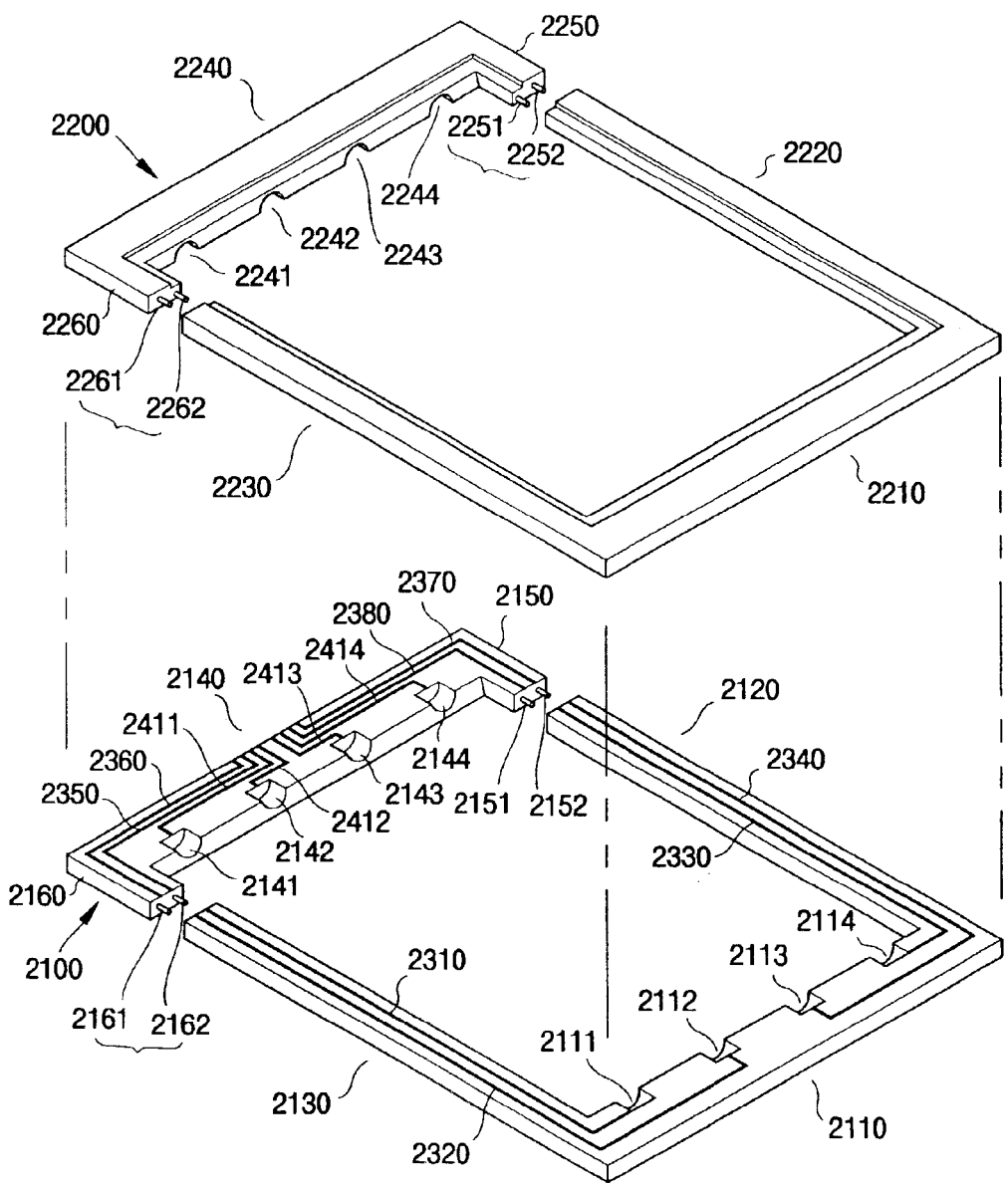
FIG. 5 is an exploded perspective view showing a structure of a mold frame according to another embodiment of the present invention.

FIG. 5 is an exploded perspective view showing a structure of a mold frame according to another embodiment of the present invention.

Referring to FIG. 5, a mold frame has a lower mold frame 2100, an upper mold frame 2200 and return wires 2310, 2320, 2330, 2340, 2350, 2360, 2370 and 2380 located between the lower and upper mold frames 2100 and 2200. Although FIG. 5 shows the return wires as being installed on the bottom mold frame 2100, the return wires 2310, 2320, 2330, 2340, 2350, 2360, 2370 and 2380 may be received in the upper mold frame 2200.

The lower mold frame 2100 has first to sixth sidewalls 2110, 2120, 2130, 2140, 2150 and 2160, each of which has a return wire located thereon.

In particular, the first sidewall 2110 has first receiving spaces 2111, 2112, 2113 and 2114, and the return wires 2310, 2320, 2330 and 2340 are located to be electrically connected to the lamps when the lamps are placed in the first receiving spaces 2111, 2112, 2113 and 2114. First lamp sockets (not shown) are disposed in the first receiving spaces 2111, 2112, 2113 and 2114 to cover one end of each of the lamps in the manner described above in reference to FIGS. 3A, 3B, and 3C for supplying a first electric power.

The second sidewall 2120 has a first end portion connected to a first end portion of the first sidewall 2110 and includes the return wires 2310 and 2320 received in the second sidewall 2120. The return wires 2310 and 2320 are extensions of the return wires in the first sidewall 2110.

The third sidewall 2130 has a first end portion connected to a second end portion of the first sidewall 2110, and includes the return wires 2330 and 2340 received in the third sidewall 2130. The return wires 2330 and 2340 are extensions of the return wires in the first sidewall 2110.

The fourth sidewall 2140 positioned substantially parallel to the first sidewall 2110 has second receiving spaces 2141, 2142, 2143 and 2144. The return wires 2411, 2412, 2413 and 2414 that are installed on the fourth sidewall 2140 become electrically connected to the second receiving spaces 2141, 2142, 2143 and 2144, respectively. The return wires 2350, 2360, 2370 and 2380 extend from the first sidewall 2110 to the fourth sidewall 2140. Here, second lamp sockets are disposed in the second receiving spaces 2141, 2142, 2143 and 2144 to cover the ends of the lamps that are not covered by the first lamp sockets.

Also, the return wires 2370 and 2380 are connected with the return wires 2330 and 2340 installed on the second sidewall 2120 and extending to the first sidewall 2110. The return wires 2350 and 2360 are connected to the return wires 2310 and 2320 installed on the third sidewall 2130 and extending to the first sidewall 2110.

The fifth sidewall 2150 has a first end portion that can be coupled to a second end portion of the second sidewall 2120 and a second end portion connected to a first end portion of the fourth sidewall 2140. The return wires 2330 and 2340 extend from the first sidewall 2110 to the fifth sidewall 2150.

The sixth sidewall 2160 has a first end portion that can be coupled to a second end portion of the third sidewall and a second end portion connected to a second end portion of the fourth sidewall 2140. The return wires 2310 and 2320 extend from the first sidewall 2110 to the sixth sidewall 2160. Here, the fifth and sixth sidewalls 2150 and 2160 are designed to fit with the second and third sidewalls 2120 and 2130, respectively. Preferably, the fifth and second sidewalls 2150 and 2120 fit together to form a straight line and the sixth and third sidewalls 2160 and 2130 fit together to form a straight line. That is, the fifth sidewall 2150 has protrusions 2151 and 2152 that fit into recesses (not shown) disposed near an end portion of the second sidewall 2120. The sixth sidewall 2160 has protrusions 2161 and 2162 that fit into recesses (not shown) disposed near an end portion of the third sidewall 2130.

The upper mold frame 2200 has first to sixth sidewalls 2210, 2220, 2230, 2240, 2250 and 2260 arranged to fit with the first to sixth sidewalls 2110, 2120, 2130, 2140, 2150 and 2160 of the lower mold frame 2100. The first sidewall 2210 in the upper mold frame 220 has third receiving spaces (not shown) arranged to match the positions of the first receiving spaces 2111, 2112, 2113 and 2114 disposed on the lower mold frame 2100.

Likewise, the fourth sidewall 2240 of the upper mold frame 2200 has fourth receiving spaces 2241, 2242, 2243 and 2244 arranged to match the positions of the second receiving spaces 2141, 2142, 2143 and 2144 on the lower mold frame 2100. The shapes of the receiving spaces may vary according to the shape of the lamp socket 243.

The fifth and sixth sidewalls 2250 and 2260 of the upper mold frame 2200 are designed to fit with the second and third sidewalls 2220 and 2230, respectively. Preferably, the fifth and second sidewalls 2250 and 2220 fit together to form a straight line and the sixth and third sidewalls 2260 and 2230 fit together to form a straight line. Namely, the fifth sidewall 2250 has protrusions 2251 and 2252 disposed that fit into recesses (not shown) disposed near an end portion of the second sidewall 2120. The sixth sidewall 2260 has protrusions 2261 and 2262 that fit into recesses (not shown) disposed near an end portion of the third sidewall 2130.

Figure 6:
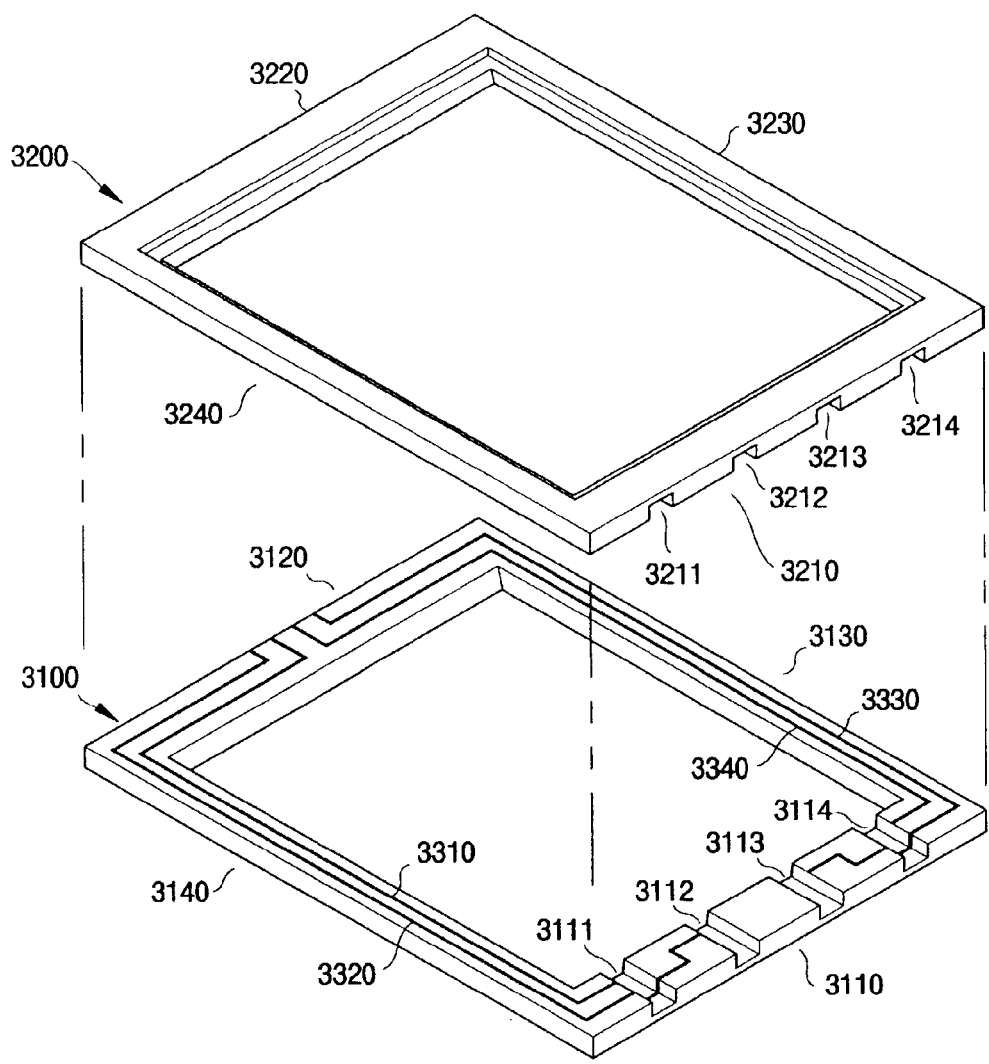
FIG. 6 is an exploded perspective view showing a structure of a mold frame according to another embodiment of the present invention.

FIG. 6. is an exploded perspective view showing a structure of a mold frame according to another embodiment of the present invention.

Referring to FIG. 6, a mold frame has a lower mold frame 3100, an upper mold frame 3200 and return wires 3310, 3320, 3330 and 3340 located between the lower and upper mold frames 3100 and 3200. The return wires 3310, 3320, 3330 and 3340 may be installed on either the lower mold frame 3100 or the upper mold frame 3200.

The lower mold frame 3100 has first to a fourth sidewalls 3110, 3120, 3130 and 3140 and first receiving spaces 3111, 3112, 3113 and 3114 disposed on the first sidewall 3110. The first receiving spaces 3111, 3112, 3113 and 3114 may include a groove that extends across the width of the first sidewall 3110 as shown, to help dissipate the heat from the lamp to the surrounding.

Also, the lower mold frame 3100 has two return wires 3330 and 3340 extending to the second sidewall 3120 via the third sidewall 3130 and another two return wires 3310 and 3320 extending to the second sidewall 3120 via the fourth sidewall 3140. Here, the return wires 3310, 3320, 3330 and 3340 are positioned to come in contact with the receiving spaces 3111, 3112, 3113 and 3114, respectively.

Particularly, the first sidewall 3110 has the first receiving spaces 3111, 3112, 3113 and 3114 and the return wires 3310, 3320, 3330 and 3340 located on the first sidewall 3110 that are electrically connected to the first receiving spaces 3111, 3112, 3113 and 3114, respectively. Here, first lamp sockets are disposed in the first receiving spaces 3111, 3112, 3113 and 3114. The first lamp sockets cover one end portion of the lamp and supply a first electric power.

The second sidewall 3120 that is positioned substantially parallel to the first sidewall 3110 receives the return wires 3310, 3320, 3330 and 3340 that extend from the first sidewall 3110.

The third sidewall 3130 has a first end portion connected to a first end portion of the first sidewall 3110 and a second end portion connected to a first end portion of the second sidewall 3120. The return wires 3310 and 3320 are installed in the third sidewall 3130, wherein the return wires 3310 and 3320 are a part of the return wires that extend from the first sidewall 3110.

The fourth sidewall 3140 has a first end portion connected to a second end portion of the first sidewall 3110, and a second end portion connected to a second end portion of the second sidewall 3120. The return wires 3330 and 3340 are installed in the fourth sidewall 3140, wherein the return wires 3330 and 3340 are a remaining part of the return wires that extend from the first sidewall 3110.

Although not shown in FIG. 6, the return wires 3310, 3320, 3330 and 3340 may be connected to the second sidewall 3120 via the third sidewall 3130 and the fourth sidewall 3140.

The upper mold frame 3200 has first to a fourth sidewalls 3210, 3220, 3230 and 3240 that are arranged to match the positions of the first to the fourth sidewall 3110, 3120, 3130 and 3140 of the lower mold frame 3100. The first sidewall 3210 of the upper mold frame 3100 has second receiving spaces (not shown) that are arranged to match the positions of the first receiving spaces 3111, 3112, 3113 and 3114 disposed on the first sidewall 3110 of the lower mold frame 3100, respectively. The shapes of the receiving spaces may vary according to the shape of the lamp socket 243. The receiving spaces for receiving the lamp sockets may be disposed on one or more sidewalls of the lower mold frame.

Figure 7:
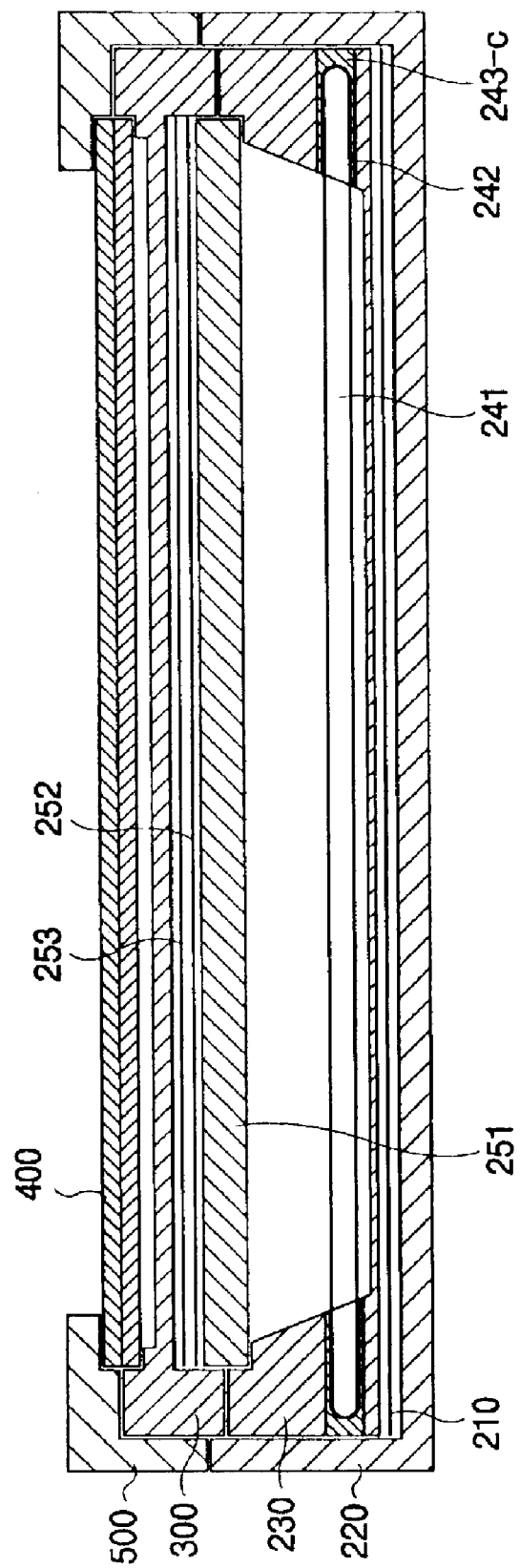
FIG. 7 is a sectional view showing an assembled structure of the LCD apparatus shown in FIG. 2.

FIG. 7 is a sectional view showing the LCD apparatus of FIG. 2 after assemblage.

Referring to FIGS. 2 and 7, the reflection plate 210, mold frame 230 and the light controlling member 250 having the diffusion plate 251 and the optical sheets 252 and 253 are sequentially disposed on the bottom chassis 220. The bottom chassis 220 is combined with the middle chassis 300 disposed on the light controlling member 250 (of which only 251, 252, and 253 are shown in FIG. 7). The LCD panel assembly 400 is disposed on the middle chassis 300 and the top chassis 500 disposed on the LCD panel assembly 400 is combined with the middle chassis 300 and the bottom chassis 220.

The mold frame 230 has a perforation hole for exposing an outer surface of the insulation cover 243-c of the lamp socket 243 that receives the lamp cap 242 covering one end portion of the lamp 241. The heat generated from the lamp 241 may dissipate to the surrounding through the perforation hole.

Figure 8:
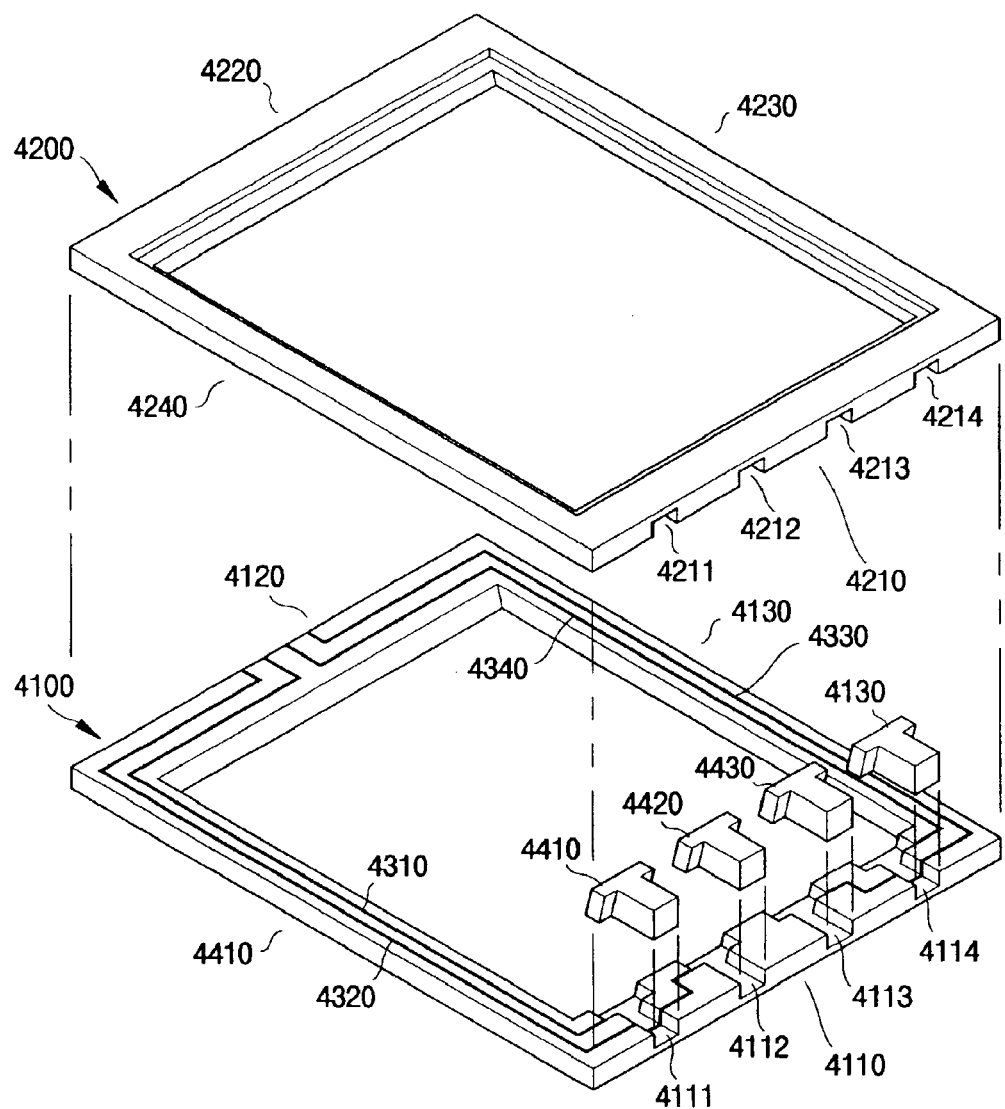
FIG. 8. is an exploded perspective view showing a structure of a mold frame according to another embodiment of the present invention.

FIG. 8. is an exploded perspective view showing a structure of a mold frame according to another embodiment of the present invention.

Referring to FIG. 8, a mold frame has a lower mold frame 4100, an upper mold frame 4200, and return wires 4310, 4320, 4330 and 4340 located between the lower and the upper mold frames 4100 and 4200. The return wires 4310, 4320, 4330 and 4340 may be installed on the lower mold frame 4100 or the upper mold frame 4200.

The lower mold frame 4100 has first to fourth sidewalls 4110, 4120, 4130 and 4140 and first receiving spaces 4111, 4112, 4113 and 4114 that are formed in the first sidewall 4110. Here, the first receiving spaces 4111, 4112, 4113 and 4114 include a groove that extends across the width of the first sidewall 4110 to allow heat generated from the lamp to escape to the surrounding.

In detail, the first sidewall 4110 has first receiving spaces 4111, 4112, 4113 and 4114 and the return wires 4310, 4320, 4330 and 4340 located on the first sidewall 4110 and electrically connected to the first receiving spaces 4111, 4112, 4113 and 4114, respectively. Here, first lamp sockets 4410, 4420, 4430 and 4440 are disposed in the first receiving spaces 4111, 4112, 4113 and 4114 to cover one end portion of the lamp for supplying a first electric power.

The second sidewall 4120 that is positioned substantially parallel to the first sidewall 4110 include return wires 4310, 4320, 4330 and 4340 that extend from the first sidewall 4110.

The third sidewall 4130 has a first end portion connected to a first end portion of the first sidewall 4110 and a second end portion connected to a first end portion of the second sidewall 4120. The return wires 4310 and 4320, which are installed in the third sidewall 4130, are a part of the return wires 4310, 4320, 4330 and 4340 that extend from the first sidewall 4110.

The fourth sidewall 4140 has a first end portion connected to a second end portion of the first sidewall 4110 and a second end portion connected to a second end portion of the second sidewall 4120. The return wires 4330 and 4340 are installed in the fourth sidewall 4140, wherein the return wires 4330 and 4340 are a part of the return wires 4310, 4320, 4330 and 4340 that extend from the first sidewall 4110.

The upper mold frame 4200 has first to fourth sidewalls 4210, 4220, 4230 and 4240 arranged to match to the first to fourth sidewalls 4110, 4120, 4130 and 4140 of the lower mold frame 4100. Here, the first sidewall 4210 of the upper mold frame 4100 has second receiving spaces 4211, 4212, 4213 and 4214 that are arranged to match the positions of the first receiving spaces 4111, 4112, 4113 and 4114 on the first sidewall 4110 of the lower mold frame 4100, respectively. The shapes of the receiving spaces may vary according to the shape(s) of the lamp socket.

Figure 9A:
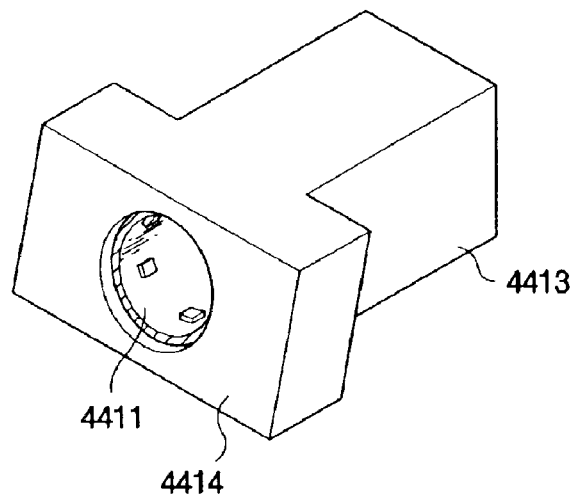
FIGS. 9A and 9B are schematic views showing a structure of a lamp socket shown in FIG. 8.
Figure 9B:
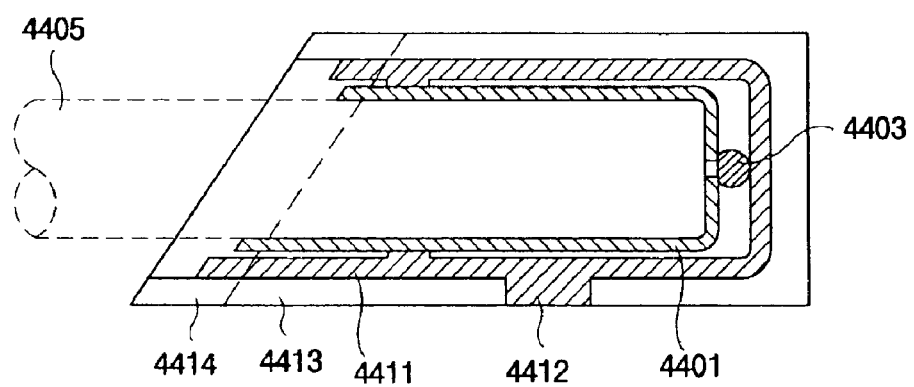

FIGS. 9A and 9B are schematic views showing a structure of a lamp socket shown in FIG. 8.

Referring to FIGS. 9A and 9B, the lamp socket 4410 includes a first lamp cap 4401 for receiving a lamp 4405, a soldering member 4403 for electrically connecting a lamp lead of the lamp 4405, withdrawn out through a perforation hole 4402 formed on the first lamp cap 4401, to the lamp socket 4410, a second lamp cap 4411 for supplying an electric power to the lamp 4405 through the soldering member 4403 and an insulation cover receiving an outer surface of the second lamp cap 4411.

The insulation cover has a body 4413 and fixing members 4414 protruding from both sides of an end portion of the body 4413 toward the mold frame and an inside surface of the fixing member 4414 is inclined with a predetermined angle. The angle of the inclined inside surface of the fixing member 4414 is coincident with the angle of the inside surface of the mold frame. The inclined inside surface of the mold frame and the fixing member may remove dark portions in an effective display area.

Also, the insulation cover is made of a heatproof material, for example, a silicon material. The insulation cover made of the silicon material may help dissipate the heat generated from the lamp to the surrounding.

Figure 10:
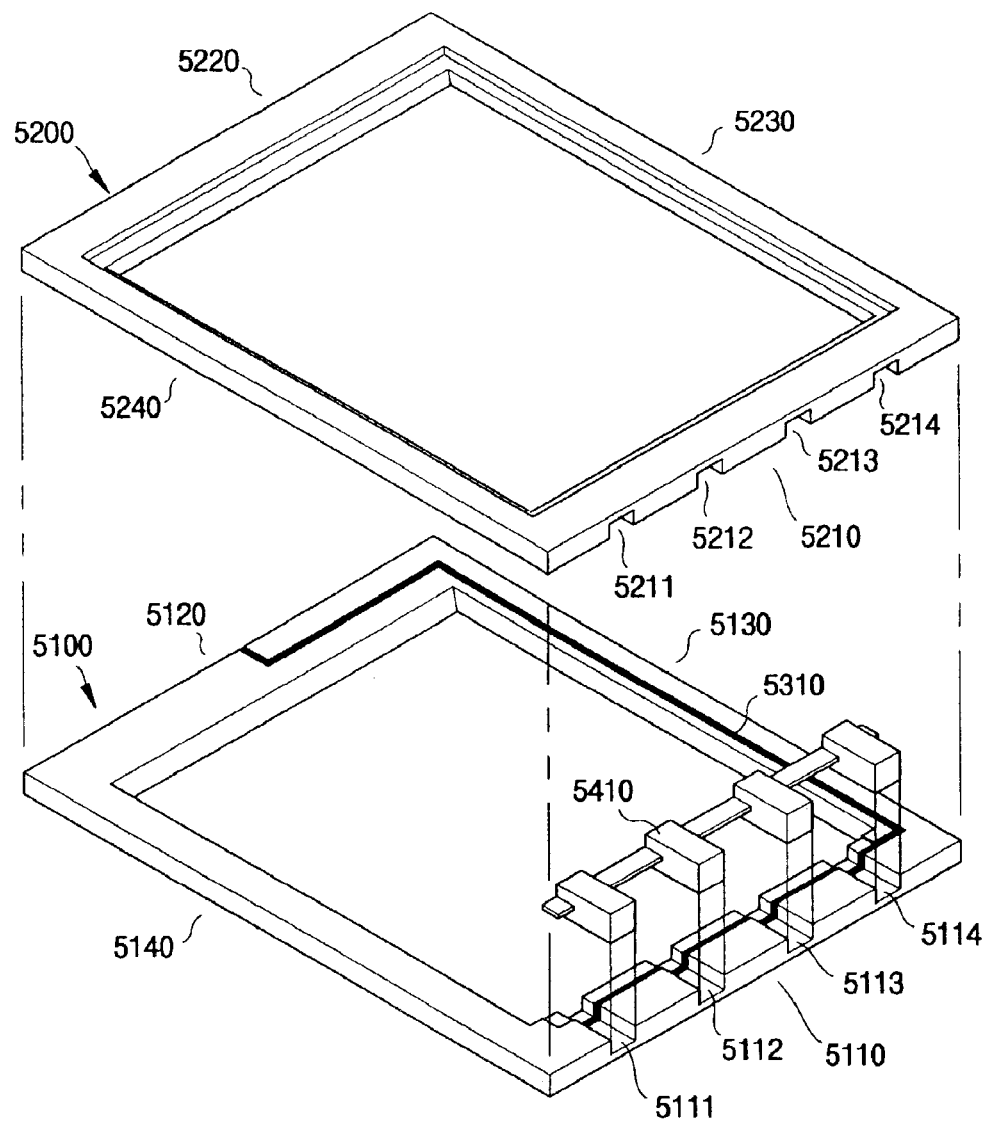
FIG. 10. is an exploded perspective view showing a structure of a mold frame according to another embodiment of the present invention.

FIG. 10 is an exploded perspective view showing a structure of a mold frame according to another embodiment of the present invention. In FIG. 10, an upper mold frame and a lower mold frame are shown as separated from each other.

Referring to FIG. 10, a mold frame has a lower mold frame 5100, an upper mold frame 5200 and return wire 5310 received between the lower and the upper mold frames 5100 and 5200. Although not shown in FIG. 10, the return wire 5310 may be received in the upper mold frame 5200.

The lower mold frame 5100 has first to fourth sidewalls 5110, 5120, 5130 and 5140 and receiving spaces 5111, 5112, 5113 and 5114 formed in the first sidewall 5110. Here, each of the receiving spaces 5111, 5112, 5113 and 5114 have a groove that extends across the width of the first sidewall 5110 to help the heat generated from the lamp dissipate into the surrounding.

In detail, the first sidewall 5110 has first receiving spaces 5111, 5112, 5113 and 5114 and the return wire 5310 received in the first sidewall 5110 to be electrically connected to the first receiving spaces 5111, 5112, 5113 and 5114. Here, first lamp socket 5410 is disposed in the first receiving spaces 5111, 5112, 5113 and 5114 to cover one end portion of the lamp for supplying the first electric power.

The second sidewall 5120 that is positioned parallel to the first sidewall 5110 receives the return wire 5310 that extends from the first sidewall 5110.

The third sidewall 5130 has a first end portion connected to a first end portion of the first sidewall 5110 and a second end portion connected to a first end portion of the second sidewall 5120. The return wires 5310 that extend from the first sidewall 5110 are installed on the third sidewall 5130.

The fourth sidewall 5140 has a first end portion connected to a second end portion of the first sidewall 5110 and a second end portion connected to a second end portion of the second sidewall 5120.

The upper mold frame 5200 has first to fourth sidewalls 5210, 5220, 5230 and 5240 opposite to the first to the fourth sidewall 5110, 5120, 5130 and 5140 of the lower mold frame 5100. Here, the first sidewall 5210 of the upper mold frame 5100 has second receiving spaces 5211, 5212, 5213 and 5214 opposite to the first receiving spaces 5111, 5112, 5113 and 5114 disposed on the first sidewall 5110 of the lower mold frame 5100, respectively. In FIG. 10, the receiving spaces are described as square-shaped; however, the shapes of the receiving spaces 5111, 5112, 5113 and 5114 may vary according to the shape of the first lamp socket 5410.

Figure 11:
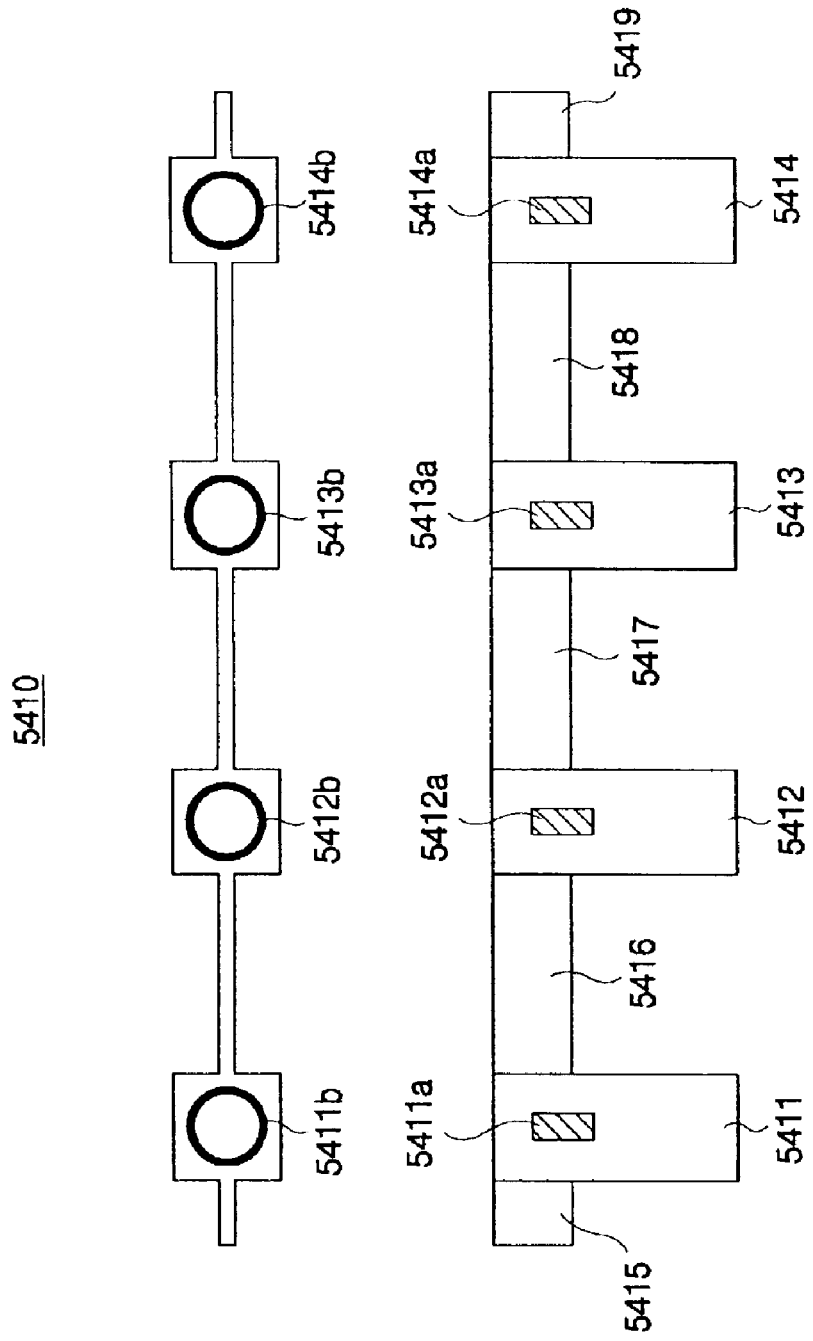
FIG. 11 is a schematic view showing a structure of a lamp socket shown in FIG. 10.

FIG. 11 is a schematic view showing a structure of a lamp socket shown in FIG. 10.

Referring to FIGS. 10 and 11, the lamp socket has second lamp caps 5411b, 5412b, 5413b and 5414b placed in receiving spaces of the mold frame 5100 for receiving first lamp caps (not shown) covering one end portion of the lamps, and has insulation cover receiving an outer surface of second lamp caps 5411b, respectively.

The insulation cover has a height greater than the diameter of the lamp to receive the second lamp caps 5411b, 5412b, 5413b and 5414b and a length longer than that of the first and second receiving spaces to be partially exposed by extended length.

Also, the second lamp caps 5411b are partially exposed through the perforation hole formed on the insulation cover, and exposure members 5411a, 5412a, 5413a and 5414a make contact with the return wires installed in the first receiving spaces 5111, 5112, 5113 and 5114 formed in the mold frame 5100, respectively.

As abovementioned, an LCD apparatus having a direct illumination type backlight assembly according to the present invention includes return wires installed in a mold frame and lamp sockets electrically connected to the installed return wires. Therefore, the overall sizes of a mold frame, a backlight assembly having the mold frame and an LCD apparatus having the mold frame can be reduced by installing the return wires on the mold frame according to the invention.

Also, the backlight assembly according to the present invention may be easily assembled without an additional step such as arranging the return wires or turning the bottom chassis upside down for arranging the wires, since the return wires are received in the mold frame. With fewer steps in the assembly process, the cost of production of the backlight assembly may be reduced.

Furthermore, receiving spaces for receiving lamp sockets are formed on a sidewall of the mold frame. Since these receiving spaces hold the lamp units that generate heat, the grooves of the receiving spaces can be extended across the width of the sidewall to help heat dissipation, thereby maintaining the temperature of the LCD apparatus at a desired level.

Although preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A mold frame for supporting a lamp of a direct illumination type backlight assembly, the mold frame comprising:
    a first sidewall having a first receiving space formed thereon to receive a first lamp socket that is coupled to a first portion of the lamp configured to supply a first electric power to the lamp, and at least one first wire received in the first receiving space and electrically connected to the first lamp socket;
    a second sidewall opposed to the first sidewall, the second sidewall having at least one second wire coupled to the first wire;
    a third sidewall having a first end portion connected to a first end portion of the first sidewall, and a second end portion connected to a first end portion of the second sidewall, wherein at least one third wire is installed on the third sidewall to connect the first wire to the second wire; and
    a fourth sidewall having a first end portion connected to a second end portion of the first sidewall, and a second end portion connected to a second end portion of the second sidewall.

2. The mold frame in claim 1, wherein the third wire installed on the third sidewall connects a part of the at least one first wire to a part of the at least one second wire, and the fourth sidewall has at least one fourth wire connecting another part of the at least one first wire to another part of the at least one second wire.

3. The mold frame in claim 1, wherein the second sidewall has a second receiving space to receive a second lamp socket covering a second portion of the lamp configured to supply a second electric power to the lamp, and has wires exposed in the second receiving space and electrically connected to the second lamp sockets, respectively.

4. The mold frame in claim 3, wherein the third sidewall is composed of a separably coupled fifth sidewall and a separably coupled sixth sidewall wherein one of the fifth sidewall and the sixth sidewall has at least one first protruding member, and the other of the fifth sidewall and the sixth sidewall has at least one first recessed member corresponding to the first protruding member, and the fourth sidewall is composed of a separably coupled seventh sidewall and a separably coupled eighth sidewall wherein one of the seventh sidewall and the eighth sidewall has at least one second protruding member, and the other of the seventh sidewall and the eighth sidewall has at least one second recessed member corresponding to the second protruding member.

5. The mold frame in claim 1, wherein a part of the first wire is exposed in the first receiving spaces.

6. The mold frame in claim 1, wherein a plurality of the first wire is individually received in each of the first receiving spaces, and electrically contacted to the first lamp sockets, respectively.

7. The mold frame in claim 1, wherein the at least one first wire is received across the first receiving spaces, and electrically contacted to the first lamp sockets.

8. A backlight assembly comprising:
a first receiving container having a bottom surface and sidewalls protruded from the bottom surface;
a lamp assembly including lamps configured to generate light, and lamp sockets configured to receive at least portions of the lamps to supply electric powers to the lamps, respectively;
a second receiving container having sidewalls to be received in the first receiving container, and at least one conductive line electrically connected to the lamp sockets;
a light controlling unit disposed on the sidewalls of the second receiving container for controlling paths of the lights emitted from the lamp assembly; and
a third receiving container coupled with the second receiving container and configured to fix the light controlling unit.

9. The backlight assembly in claim 8, further comprising a light reflection component disposed under the lamps and on the bottom surface of the first receiving container for reflecting the lights emitted from the lamps toward the light controlling component.

10. The backlight assembly in claim 8 further comprising a conductive line received in the second receiving container and electrically coupled to the lamp sockets with one-to-one correspondence.

11. The backlight assembly in claim 10, wherein the lamp sockets are electrically conductive caps for supplying electric power to end portions of the lamps.

12. The backlight assembly in claim 8, wherein the conductive line is received in the second receiving container and electrically coupled to the lamp sockets with one-to-multiple correspondence.

13. The backlight assembly in claim 8, wherein the lamp assembly includes:
a socket wire coupled to the conductive line to be received the first electric power through the conductive line;
a first electrically conductive cap connected to the socket wire configured to transmit the first electric power;
a second electrically conductive cap received in the first electrically conductive cap configured to provide an end portion of each of the lamps with the first electric power through the first electrically conductive cap; and
an insulation cover received in a first receiving space formed in the second receiving container configured to receive the first and the second electrically conductive caps.

14. The backlight assembly in claim 13, wherein the lamp sockets in the second receiving container transmit heat generated from the lamps through the insulation cover.

15. The backlight assembly in claim 13, wherein the insulation cover is composed of silicon.

16. The backlight assembly in claim 8, wherein the second receiving container includes:
a first sidewall having first receiving spaces to respectively receive first lamp sockets covering first portions of the lamps configured to supply first electric powers to the lamps, and having at least one first conductive line received in the first receiving spaces and electrically connected to the first lamp sockets, respectively;
a second sidewall opposed to the first sidewall, the second sidewall having a second conductive line prolonged from the first conductive line;
a third sidewall having a first end portion connected to a first end portion of the first sidewall and a second end portion connected to a first end portion of the second sidewall, the third sidewall having a third wire configured to connect the first conductive line to the second wire; and
a fourth sidewall having a first end portion connected to a second end portion of the first sidewall and a second end portion connected to a second end of the second sidewall.

17. The backlight assembly in claim 16, wherein the third conductive line in the third sidewall connects a part of the first conductive lines to a part of the second conductive lines, and the fourth sidewall has a fourth conductive line, the fourth conductive line connecting remaining part of the first conductive lines to remaining part of the second conductive lines.

18. The backlight assembly in claim 16, wherein the second sidewall has second receiving spaces respectively receiving second lamp sockets which cover second portions of the lamps configured to supply second electric power to the lamps, and has conductive lines received in the second receiving spaces to be electrically connected to the second lamp sockets, respectively.

19. The backlight assembly in claim 18, wherein the second lamp sockets cover second portions of the lamps configured to apply second electric powers to second portions of the lamps.

20. The backlight assembly in claim 16, wherein the first lamp sockets cover the first portions of the lamps configured to apply the first electric powers to the first portions of the lamps, respectively.

21. The backlight assembly of claim 8, wherein the first, second, and third receiving containers comprises a bottom chassis, a mold frame and a middle chassis, respectively.

22. A liquid crystal display device comprising;
a backlight assembly configured to emit light, the backlight assembly including
a lamp assembly having a lamp socket that has protrusions to hold a lamp in a fixed position, wherein the lamp socket is configured to supply electric power to the lamp,
a light controlling unit configured to control a path of light emitted from the lamp assembly, and
a receiving container having at least one conductive line electrically connected to the lamp socket, the path of the light controlled by the light controlling unit; and
a liquid crystal display panel disposed on the backlight assembly and configured to display an image in response to the light emitted from the backlight assembly.

23. The liquid crystal display device in claim 22, wherein the receiving container comprises:
a first sidewall having first receiving spaces to respectively receive first lamp sockets covering first portions of the lamps configured to supply first electric power to the lamps and having at least one first conductive line partially received in the first receiving spaces and electrically connected to the first lamp sockets, respectively;
a second sidewall opposed to the first sidewall, the second sidewall having a second conductive line prolonged from the first wire;
a third sidewall having a first end portion connected to a first end portion of the first sidewall and a second end portion connected to a first end portion of the second sidewall, the third sidewall having a third conductive line configured to connect the first conductive line to the second conductive line; and a fourth sidewall having a first end portion connected to a second end portion of the first sidewall and a second end portion connected to a second end of the second sidewall.

24. The liquid crystal display device in claim 22, wherein the third conductive line in the third sidewall connects a part of the first conductive line to a part of the second conductive line; and the fourth sidewall has a fourth connecting remaining part of the first conductive line to remaining part of the second conductive line.

25. The liquid crystal display device in claim 22, wherein the first lamp sockets contacting the first sidewall transmit heat generated from the lamps through the first sidewall.

26. The liquid crystal display device of claim 22, wherein the backlight assembly further comprises a chassis having a bottom surface and sidewalls protruded from the bottom surface to receive the receiving container.

27. A mold frame for a liquid crystal display device, the mold frame comprising:

a frame having at least one receiving section to accommodate a lamp; and a wire disposed an the frame and supplying power to the lamp, wherein the wire is coupled to a portion of the lamp that is resting in the receiving section, and wherein the wire extends in a direction that is substantially parallel to a length of the lamp.

28. A backlight assembly comprising:

a bottom chassis having a bottom surface and sidewalls protruding from the bottom surface;

a lamp assembly including lamps configured to generate light and lamp sockets configured to receive at least portions of the lamps to supply electric power to the lamps;

a mold frame having sidewalls and at least one conductive line formed on the sidewalls that is electrically connected to the lamp sockets, wherein the mold frame is configured to be placed in the bottom chassis; and a light controlling unit positioned on the mold frame and configured to control paths of the lights emitted from the lamp assembly.

29. The backlight assembly of claim 28, further comprising a middle chassis coupled with the mold frame configured to fix the light controlling unit.

30. A mold frame for a liquid crystal display device, the mold frame comprising:

a frame having at least one receiving section to accommodate a lamp; and a wire received in the frame and supplying power to the lamp, wherein the wire is coupled to a portion of the lamp that is resting in the receiving section, wherein the wire extends in a direction that is substantially parallel to a length of the lamp.

* * * * *